INVENTORS
EUVAL S. BARREKETTE
CHARLES V. FREIMAN
DENOS C. GAZIS
JOHN E. LOVELL

BY Francis J. Thomas
ATTORNEY

July 1, 1969 E. S. BARREKETTE ET AL 3,453,595

OPTIC TO ACOUSTIC CONVERTER FOR PATTERN RECOGNITION

Filed June 30, 1964 Sheet 2 of 3

OPTIC TO ACOUSTIC CONVERTER FOR PATTERN RECOGNITION

Filed June 30, 1964 Sheet 3 of 3

United States Patent Office 3,453,595

Patented July 1, 1969

3,453,595

OPTIC TO ACOUSTIC CONVERTER FOR PATTERN RECOGNITION

Euval S. Barrekette, New York, Charles V. Freiman, Pleasantville, and Denos C. Gazis, Millwood, N.Y., and John E. Lovell, Greenwich, Conn., assignors to International Business Machines Corporation, New York, N.Y., a corporation of New York Filed June 30, 1964, Ser. No. 379,224
Int. Cl. G06k 9/02
U.S. Cl. 340—146.3 29 Claims

ABSTRACT OF THE DISCLOSURE

A converter for pattern recognition which changes an optical image of a symbol into a usable digital representation, via an optic-acoustic interaction. The optical image is impressed upon an optic-to-acoustic converter through which travels trains of acoustic pulses. The amplitude of these acoustic pulses is changed when light from the optical image is incident on the converter, hence the acoustic pulses are modulated with information corresponding to the symbol. These modulated acoustic pulses are formed into electrical pulses by a transducer. Means are provided to recirculate the pulse trains through the optic-to-acoustic converter for further alteration by the same or different optical images. The electrical output signals are utilized in a recognition machine.

This invention relates to a device for converting an optical pattern into a form that is usable by a machine and, in particular, to an apparatus for sensing an optical pattern to produce an electric signal representation of the pattern.

Pattern recognition systems require scanners or other devices to convert optical representations into electric signals. These signals are then analyzed in order to identify the pattern. Pattern recognition systems usually employ either a cathode ray tube "flying spot" scanner or a matrix of photosensitive cells to convert the optical pattern into electric signals. These devices are relatively complicated and expensive and are generally incapable of storing the pattern of electric signals for subsequent analysis.

The term "scanner" is used herein to describe all devices which convert optical patterns into electric signals regardless of whether the pattern is actually scanned with a raster in the conventional manner. Thus, the term is intended to encompass matrices of photosensitive cells and other nonsequential devices.

The inventive scanner employs an essentially two-dimensional, optic-to-acoustic converter to alter acoustic signals with optical patterns. The basic phenomenon of attenuation and amplification of acoustic pulses by light is described in articles entitled Photosensitive Ultrasonic Attenuation in CdS by H. D. Nine, Physical Review Letters, vol. 4, No. 7, Apr. 1, 1960, pp. 359–361; and Amplification of Ultrasonic Waves in Piezoelectric Semiconductors by D. L. While, Journal of Applied Physics, vol. 33, No. 8, August 1962, pp. 2547–2554.

In the present invention, the pattern to be scanned is impressed upon the optic-to-acoustic converter while trains of acoustic pulses are present within the converter. The amplitude of the pulses is altered by the intensity of the impressed light. The pulse trains are then converted into electric signals whose amplitudes represent the configuration of the applied pattern. In order to provide greater sensitivity, the modified pulse trains can be reapplied to the converter for further alteration by the same optical pattern during subsequnet cycles. The resultant electric signals are then applied to a recognition system or other utilization device. Alternatively, different optical patterns can be impressed upon the converter as the modified pulse trains are reapplied to enable various functions of optical patterns to be combined or to perform mathematical computations where the operands are represented by the applied patterns.

In addition to scanning a pattern, the apparatus is capable of storing a previously-scanned pattern by recirculating the altered pulse trains without further impressing the pattern upon the converter. Various operations, such as signal enhancement and feature detection, can be performed while the pulse trains are being recirculated.

Thus, it is an object of the invention to provide a scanner employing an optic-to-acoustic converter.

Another object is to provide a scanner for a pattern recognition system wherein the pattern is optically impressed upon an optic-to-acoustic converter to alter acoustic pulse trains such that the amplitudes of the pulses represent the pattern.

A further object is to provide a scanning apparatus using an optic-to-acoustic converter wherein a single pattern or different patterns are optically impressed upon recirculating acoustic pulse trains to alter the amplitude of the pulses.

A further object is to provide a scanner and storage apparatus using an optic-to-acoustic converter wherein a pattern or different patterns are optically impressed one or more times upon recirculating acoustic pulse trains to alter the amplitude of the acoustic pulses, and wherein the altered pulse trains are stored by recirculation in the converter.

A still further object is to show a scanner wherein a train of electric pulses is converted into an acoustic pulse train and applied to an optic-to-acoustic converter, wherein an optical pattern is impressed upon the converter to alter the amplitude of the acoustic pulses, and wherein the altered pulse train is converted into a train of electric pulses whose amplitudes are representative of the applied pattern.

A still further object is to show a scanner wherein a train of electric pulses is converted into an acoustic pulse train and applied to an optic-to-acoustic converter, wherein an optical pattern is impressed upon the converter to alter the amplitude of the acoustic pulses, wherein the altered pulse train is converted into a train of electric pulses whose amplitudes are representative of the applied pattern, and wherein the electric pulses are then converted into acoustic pulses for application to the converter during a subsequent cycle.

The foregoing and other objects, features and advantages of the invention will be apparent from the following more particular description of a preferred embodiment of the invention, as illustrated in the accompanying drawings.

Figures 2, 2A:
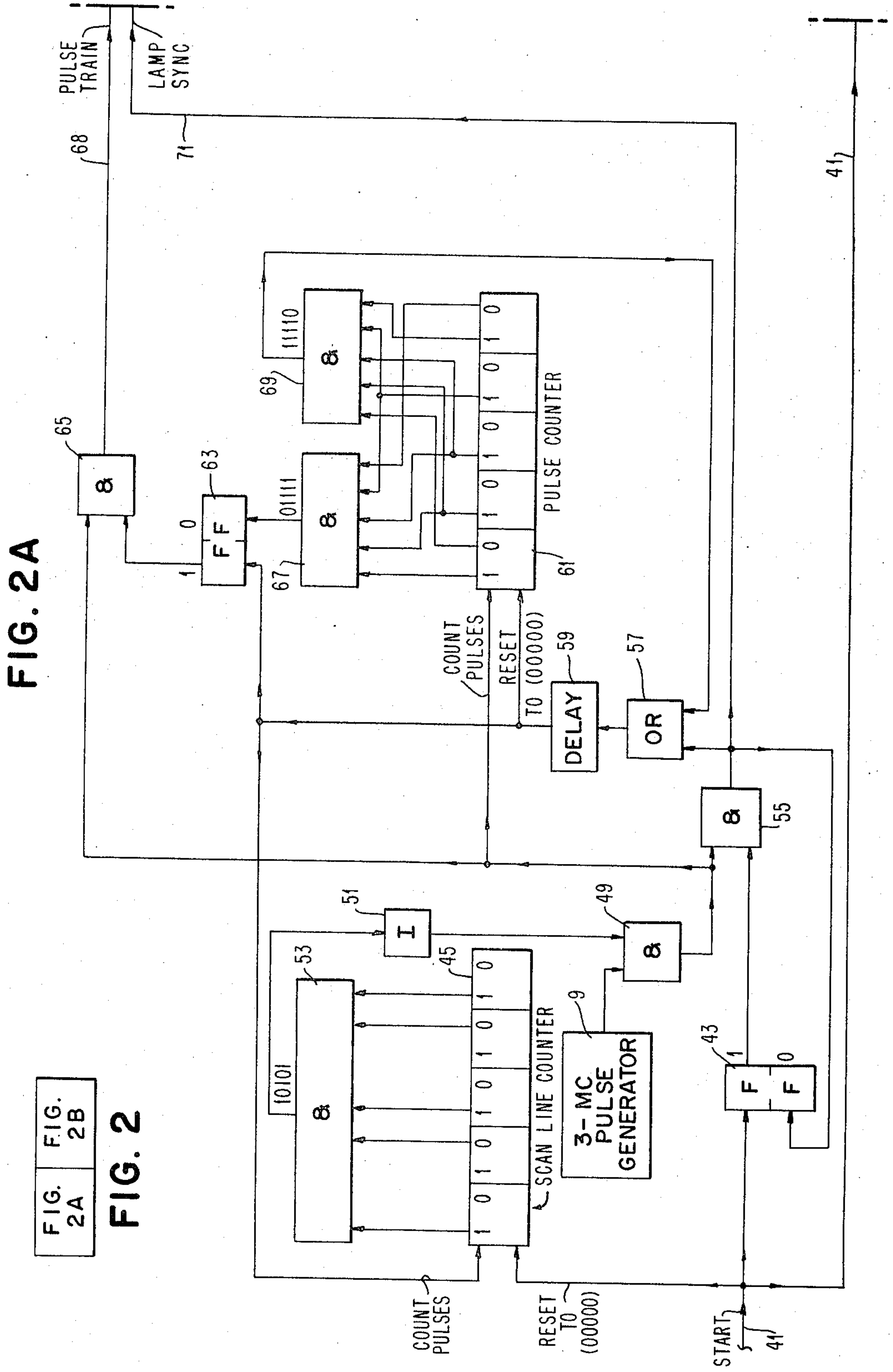
FIG. 2 is a diagram showing the arrangement of FIGS. 2A and 2B.
Figure 2B:
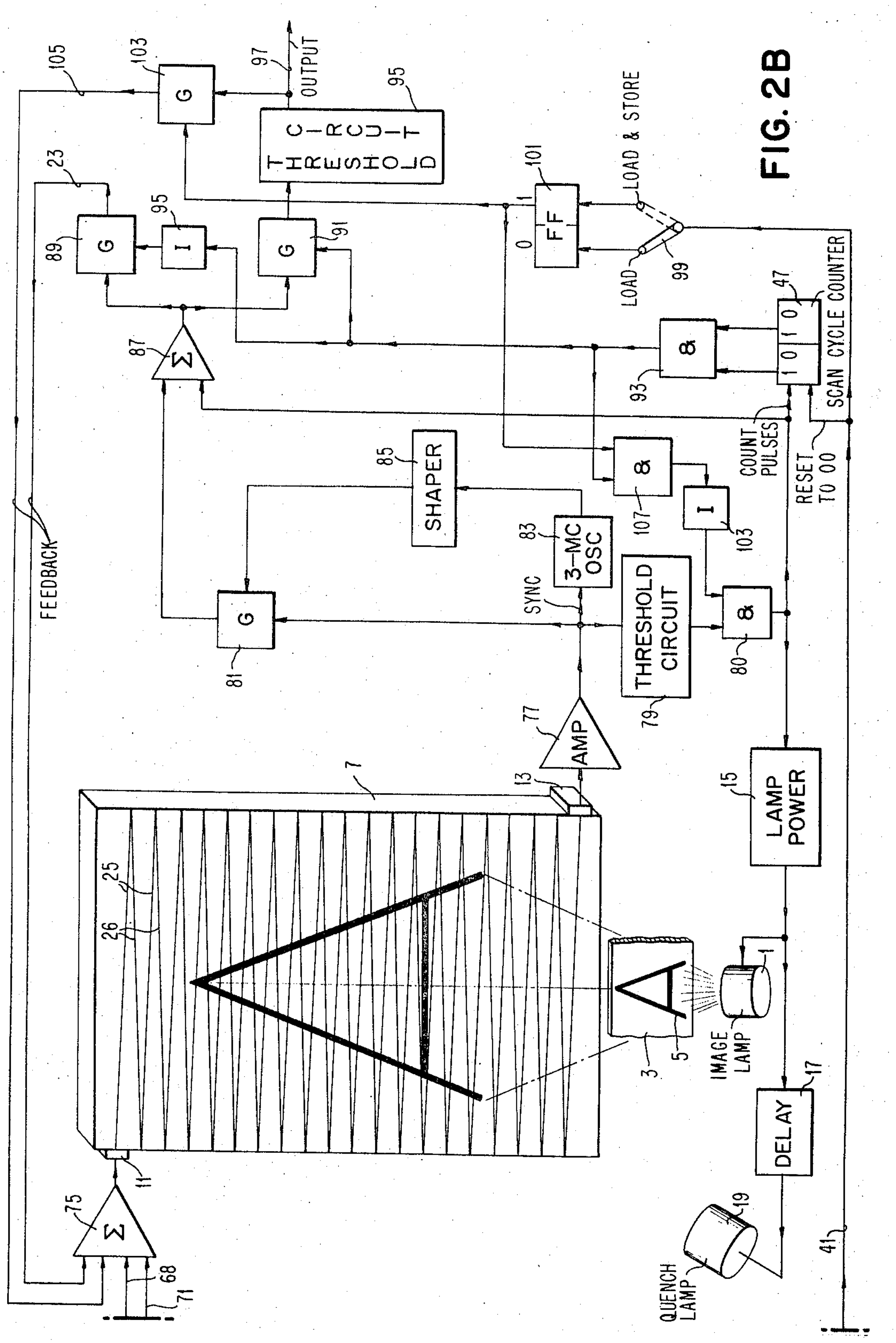

FIGS. 2A and 2B constitute a detailed diagram of the preferred embodiment of the invention.

Figure 1:
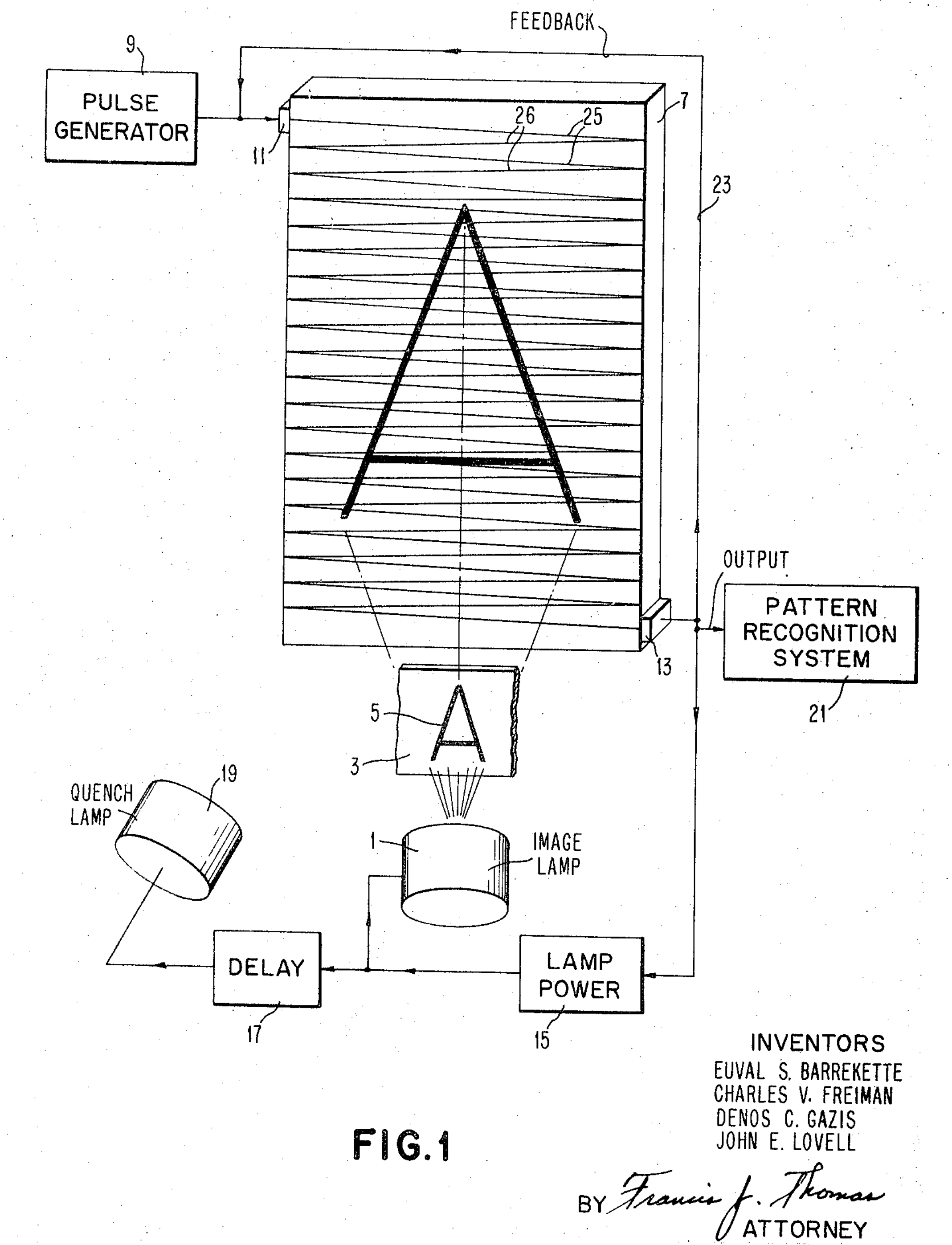
FIG. 1 is a block diagram of the preferred embodiment of the invention.

In FIG. 1, an image lamp 1 directs light toward a transparency 3 containing a pattern 5 to be scanned. The light that is transmitted by the transparency is impressed upon the surface of an essentially two-dimensional optic-to-acoustic converter 7. Although the transparency is shown to be separated from the converter in the drawings for simplicity of understanding, in the preferred embodiment of the invention, the transparency is located parallel to, and adjacent to the surface of the converter in order to provide a clear shadow of the pattern upon the converter without requiring lenses. Obviously, a more elaborate optical system can be used if pattern amplification or attenuation is desired.

A pulse generator 9 supplies a series of electric pulses to an input transducer 11 which converts the electric pulses to acoustic pulses. The acoustic pulses are reflected by the surfaces of the converter and finally arrive at an output transducer 13 which converts the acoustic pulses to electric pulses. The image lamp 1 is activated by a lamp power circuit 15 when the first pulse that is applied to the converter is sensed at the output transducer. The activation of the lamp causes the pattern 5 to be impressed upon the converter which, in turn, causes acoustic pulses in the converter to be altered in amplitude by amounts dependent upon the intensity of the impressed light. Then the acoustic pulses are sensed by the output transducer 13 to develop a series of electric pulses whose amplitudes are representative of the pattern 5. The signal from the lamp power circuit 15 is applied through a delay 17 to activate a quench lamp 19 at a time shortly after the image lamp is activated. The use of the image lamp and the quench lamp in conjunction with the converter, and the system parameters, are described in detail below.

The series of electric pulses that is developed by the output transducer 13 can be applied directly to pattern recognition system 21 or other utilization device but, preferably, the signal is first applied as feedback on a conductor 23 to the input transducer 11. The output of the pulse generator 9 is replaced by the signal from transducer 13 during the second and subsequent cycles of operation, during which time the pattern 5 or another pattern is impressed upon the converter to further alter the amplitude of the acoustic pulses. When the same optical pattern is reapplied to the converter several times, greater sensitivity is obtained. After recirculating the pulse train for the desired number of times, the output from transducer 13 is applied to the pattern recognition system or other utilization device. The series of electric pulses from the output transducer 13 can be stored for subsequent application to the pattern recognition system by recirculating the pulses without further impression of the pattern 5.

The converter 7 can be fabricated from any of a number of piezoelectric crystals. Certain crystals are preferable because they exhibit a relatively large optic-to-acoustic effect. A detailed description of crystals that can be used in the present invention is found in the above-mentioned article by D. L. White.

In general, all ferroelectrics contain the desirable piezoelectric properties. In addition, the converter can be fabricated from a crystal in the wurtzite family of crystals (semiconductor II–VI compounds) including ZnO, CdS, ZnS, CdSe, CdTe, and ZnTe or the zinc-blende family of crystals (semiconductor III–V compounds) including GaAs, InSb, GaP, InAs, and AlP. These various types of piezoelectric crystals exhibit the optic-to-acoustic effect when properly activated by acoustic pulses. The wurtzite family of crystals exhibits the effect when longitudinal acoustic waves propagate in the direction of the optic axis and when shear waves propagate in a direction that is perpendicular to the optic axis and have displacements in the direction of the optic axis. The zinc-blende family of crystals exhibits the effect when longitudinal acoustic waves propagate in the (111) direction and when shear waves propagate in the (110) direction.

In the preferred embodiment of the invention, a cadmium sulfide (CdS) crystal is employed because of its ease of fabrication and the relatively large optic-to-acoustic effect that it provided. A detailed description of the method of growth of CdS and other crystals of this type is found in an article by D. R. Boyd and Y. T. Sihvonen entitled, Vaporization—Crystallization Method for Growing CdS Single Crystals, Journal of Applied Physics, vol. 30, No. 2, February 1959, pages 176–179. Two types of CdS crystals can be used; in one type, the crystal shows a decrease of attenuation upon irradiation with light over the spectral range of 5100 A. to 8000 A.; in a second type, the crystal shows an increase of attenuation upon irradiation with light in this range of frequencies. The second (attenuating) type of CdS crystal is employed in the preferred embodiment of the invention because the optic-to-acoustic effect is significantly greater than in the first type of crystal. A detailed discussion of the characteristics of CdS crystals is contained in an article by H. D. Nine and R. Truell entitled Photosensitive-Ultrasonic Properties of Cadmium Sulfide, Physical Review, vol. 123, No. 3, Aug. 1, 1961, pages 799–803.

Although the dimensions of the converter are not critical, the converter in the preferred embodiment of the invention is a CdS crystal having a width of 2.2 cm. and a length of 2.5 cm. and a thickness of about 1 cm. The crystal is shown diagrammatically in FIG. 1 where the input transducer 11 is arranged to introduce acoustic pulses with longitudinal wave propagation in the direction of the optical axis and shear wave propagation in a direction that is perpendicular to the optic axis. The pulses are reflected (as shown in FIG. 1) to produce a two-dimensional raster of scan lines which, in the preferred embodiment of the invention, contains twenty left-to-right lines 25 and nineteen retrace (right-to-left) lines 26. The output transducer 13 is arranged to intercept the last scan line to convert the acoustic pulses to electric pulses. Quartz transducers 11 and 13 are used in the preferred embodiment. Although the transducer size is arbitrary, a suitable transducer is one that is .05 cm. thick, with a surface area of .1 cm. x 1 cm.

As described above, when the acoustic pulses are distributed throughout the crystal, the pattern 5 is impressed upon the crystal to attenuate the acoustic pulses by amounts related to the intensity of the light. In the preferred embodiment which uses 39 scan lines (including 19 retrace lines) the acoustic pulses are attenuated by approximately 95.8 db without the impression of light and by approximately 97.8 db in the presence of an intense light (approximately 2–10 watts/sq. cm.). Thus, pulses having a difference of approximately 2 db in attenuation are available at the output transducer. The input pulses can be of arbitrary voltage, the range 100–600 volts being suitable. As long as the output pulses from the converter 7 are sufficient to detect, amplify, and shape, while maintaining relative amplitudes, any magnitude input pulses can be used.

A continuous stream of pulses can be applied to the converter but, in the preferred embodiment, pulses are only present on the scan lines 25 (to avoid the necessity of compensation in the recognition system for the reverse direction of the rescan lines 26). In order to place acoustic pulses only on the left-to-right scan lines, groups of pulses are provided by the pulse generator 9 with adequate spacing between the groups. With a 2.2 cm. CdS crystal converter, pulses require approximately 5 microseconds to travel the width of the crystal (acoustic velocity in CdS is approximately $4.3 \times 10^5$ cms./sec.). In the preferred embodiment of the invention, 15 pulses having a frequency of approximately 3 megacycles and a duty cycle of approximately 0.1 is provided by the pulse generator and the pulse trains are separated in time by approximately 5 microseconds. A much larger timing pulse is applied to the input transducer immediately before the occurrence of the first pulse train. This pulse is sensed at the output transducer and supplied by the lamp power circuit 15 to cause the image lamp 1 to be activated at the proper instant (when the pulse trains are present on the twenty scan lines in the converter). A conventional lamp strobe circuit is employed to energize any conventional lamp such as a tungsten lamp which provides energy (at a power density of at least 2 watts/sq. cm.) in the wave length range between 5100 A. and 8000 A. High-resolution operation (rapid rate of recovery in the crystal) is achieved by quenching the crystal with infrared radiation (8000 A.–10,000 A. at a power density 1 watts/sq. cm.) from the quench lamp 19. This lamp is energized by the strobe pulse from the lamp power supply 0.33 microsecond after the scan lamp is activated, due to the operation of the delay 17. Without the use of a quench lamp, the attenuation returns from its illuminated value to its dark value at room temperature in about 0.5 microsecond. The use of the infrared quench lamp causes the crystal to recover much more rapidly (in approximately 0.1 microsecond).

The input and output transducers are not necessary when the CdS crystal is operated in a mode wherein the surfaces of the crystal act as transducers, as discussed in the above-cited article by Nine and Truell. In addition, a DC electric field can be applied lengthwise to the crystal to provide additional attenuation or amplification of the acoustic pulses. The DC current flowing through the crystal in the presence of acoustic pulses creates a traveling AC field which interacts with the pulses. Amplification occurs when the drift velocity of the electrons exceeds the velocity of sound. For highly piezoelectric semiconductors, the amplification may be as high as several percent wave length of path. This type of interaction is described in detail in the previously-mentioned article by White. When an applied electric field is used, the input and output transducers are separated from the crystal by fused silica buffers to improve the isolation between the transducers and the DC electric field.

Furthermore, the single crystal converter can be replaced by several crystals, each containing one or more scan lines.

The preferred embodiment of the invention is shown in detail in FIGS. 2A and 2B. The reference numerals in FIG. 1 are carried into FIGS. 2A and 2B wherever possible.

The circuits in FIG. 2A provide the electric pulses that are applied to the input transducer 11 (FIG. 2B) of the converter 7. The operation of the system is initiated by a "start" signal on a conductor 41. This signal is applied to a "flip-flop" bistable device 43 (containing the legend FF) to cause the flip-flop to produce a signal at its "1" output. The "start" signal is also applied to reset a scan line counter 45 and a scan cycle counter 47 (FIG. 2B).

The 3 mc. pulse generator 9 supplies a continuous train of rectangular pulses to an AND gate 49 which is conditioned to pass these pulses when a signal is present from an inverter 51. Selected outputs of the scan line counter 45 are applied to an AND gate 53 such that the AND gate produces a signal when the counter contains the number 10101 (corresponding to the decimal number 21). As will be described below, a count pulse is applied to the scan line counter before the development of each pulse train that corresponds to a scan line in the converter. Thus, AND gate 53 produces a signal after the required 20 scan lines are generated. This signal from AND gate 53 is applied to inverter 51 to cause the inverter to remove the conditioning signal to AND gate 49 and, hence, to block the passage of pulses from generator 9. Thus, AND gate 49 provides a continuous series of pulses until twenty scan lines are completed.

The signal at the "1" output of flip-flop 43 conditions AND gate 55, as described above. The first pulse passed by AND gate 49 after the occurrence of the "start" signal is passed by AND gate 55 and applied to reset flip-flop 43 to remove the conditioning signal to AND gate 55. The single pulse passed by AND gate 55 is applied through an OR gate 57 and a delay 59 to reset a pulse counter 61 and to set a flip-flop 63 in its "1" state. The resultant signal at the "1" output of flip-flop 63 conditions an AND gate 65, causing it to pass the pulses supplied by AND gate 49 on an output lead 68. The delay 59 insures that AND gate 65 does not pass the same pulse from generator 9 which is used to set flip-flop 63. The pulses from AND gate 49 are also applied as "count pulses" to counter 61. Two AND gates 67 and 69 are controlled by selected outputs of the pulse counter such that an output is present from AND gate 67 after the fifteenth (01111) count pulse is applied, and an output is provided by AND gate 69 after the thirtieth (11110) count pulse is applied. The output of AND gate 67 resets flip-flop 63 to remove the conditioning signal from AND gate 65 after the fifteen pulses have been passed to the converter. After 15 more pulse times, AND gate 69 provides an output through OR gate 57 and delay 59 to again reset pulse counter 61 and to again set flip-flop 63. Thus, each alternate 15 pulse sequence from generator 9 is passed by AND gate 65. Hence, with the proper pulse frequency (from pulse generator 9), converter 7 (FIG. 2B) contains fifteen pulses on each scan line and no pulses on the rescan lines at a particular instant during the cycle of operation.

The signal provided by delay 59 (FIG. 2A) before the generation of each 15-pulse train is applied as a count pulse to the scan line counter 45. Since the scan line counter and associated circuitry cause AND gate 49 to pass pulses from generator 9 until the scan line counter contains the number 10101 (21), twenty pulses trains each containing fifteen pulses are provided to the converter.

The initial pulse that is passed by AND gate 55 is also applied on a lead 71 to the converter to be used to synchronize the operation of the lamps in FIG. 2B.

In FIG. 2B, the pulse trains on conductor 68 and the lamp sync signal on conductor 71 are applied to a summing amplifier 75. The summing amplifier combines these signals along with two feedback signals which are described subsequently. The summing amplifier is a conventional analog circuit containing a resistor input network which enables the applied signals to be weighted with respect to each other. The summing amplifier inputs are weighted such that the lamp sync signal on conductor 71 provides a much larger output from the summing amplifier than is provided by the other inputs (in the order of 10 times the amplitude). The output of the summing amplifier is supplied to the input transducer 11 to cause acoustic pulse trains to propagate through converter 7. As described above, the series of acoustic pulses are reconverted to electric pulse trains by the output transducer 13. The high-amplitude lamp sync signal is the first acoustic pulse to appear at output transducer 13. The electric pulses developed by the output transducer are applied through an amplifier 77 to a threshold circuit 79 which is arranged to pass only the high amplitude lamp sync signal. This signal is applied through an AND gate 80 to the lamp power circuit 15 to cause the image lamp 1 to be activated. As described below, the AND gate 80 is conditioned during all cycles of operation in which the lamps are to be activated. As described above, the pattern 5 on the transparency 3 is then impressed upon the converter 7 to cause the amplitude of the acoustic pulses to be altered to correspond to the configuration of the pattern. The lamp power circuit 15 also applies a signal through delay 17 to activate the quench lamp 19 shortly after the activation of the image lamp. The electric pulse train from amplifier 77 is also applied to a gate 81 to overcome the distortion caused by converter 7 and the associated components. The pulses from gate 81 are rectangular with the same duration (duty cycle) as the pulses from generator 9 (FIG. 2A), but the amplitudes of the pulses from gate 81 correspond to the amplitudes of the pulses from amplifier 77. Thus, the pulses from gate 81 vary in amplitude in accordance with the configuration of the pattern 5 without containing the distortion caused by converter 7. The distortion is eliminated by gate 81 because the pulse train from amplifier 77 is only passed by the gate at short intervals having durations corresponding to the desired pulse width. A 3 mc. oscillator 83 and a shaper 85 generates a continuous train of rectangular pulses to condition gate 81. The oscillator is synchronized by the pulse train from amplifier 77 to maintain a proper phase relationship between the rectangular pulses from shaper 85 and the distorted pulses from amplifier 77. Any well-known oscillator can be used that is sufficiently stable to maintain the proper phase relationship for 15 or more pulse cycles (corresponding to the absence of pulses between scan line pulse trains).

The series of pulses from gate 81 are applied through a summing amplifier 87 to a pair of gates 89 and 91. The lamp sync signal from threshold circuit 79 is also applied to the summing amplifier to insure that it is preserved even in the case where it is blocked by gate 81 during the initial synchronization of oscillator 83. The input network to summing amplifier 87 is arranged to cause the signal from threshold circuit 79 to be relatively heavily weighted with respect to the amplitude of the pulses from gate 81, so that it can be used for the subsequent synchronization of the circuits.

The 3 megacycle pulse generator 9 (FIG. 2A) is adjustable to provide pulses with the correct frequency such that fifteen pulses appear on each scan line 25 and no pulses occur on the rescan line 26. The pulse generator 9 is adjusted in frequency while test patterns 5 are impressed upon the converter. The output of gate 81 is monitored while adjusting the pulse generator 9.

As described above, greater system sensitivity is obtained if the altered pulse train is recirculated through the converter 7 and further altered by the impression of the pattern 5 during subsequent cycles. In the preferred embodiment of the invention, the pattern is impressed upon the converter three times under the control of a scan cycle counter 47. This counter 47 is reset to zero by the "start" signal on conductor 41 and the lamp pulses from threshold circuit 79 are applied as count pulses. AND gate 93 is arranged to provide an output signal when the counter 47 contains the number 11 (3). An inverter 95 produces a conditioning signal to gate 89 when AND gate 93 produces no output (before the count of 3). Thus, for the first three cycles of operation, gate 89 passes the pulse train from summing amplifier 87 to summing amplifier 75 on a conductor 23. The above-described operation of the converter 7 and its associated circuits is thus repeated for a second and a third cycle which differ from the first cycle only in that the previously-altered pulse trains are used in place of the pulse train and lamp sync signals that were applied on conductors 68 and 71 to the summing amplifier 75 during the first cycle of operation. Thus, the circuits in FIG. 2A perform no function after the first cycle. After three cycles of operation, the scan cycle counter 47 contains of a count of 3, causing AND gate 93 to produce a signal which, in turn, conditions gate 91 and blocks gate 89 (due to the effect of inverter 95). The pulse train from summing amplifier 87 is then applied through gate 91 and a threshold circuit 95 as the output of the system on a conductor 97. The threshold circuit 95 converts the analog pulse train into a binary pulse train containing a pulse whenever an analog pulse exceeds a predetermined threshold.

The inventive scanner has been described in its "load" mode of operation wherein a pattern is impressed upon the converter to produce an output binary pulse train representative of the pattern. The scanner is also capable of both scanning and storing a pattern during a "load and store" mode of operation. In this mode of operation, the "start" signal is applied on conductor 41 through the "load and store" contacts of a switch 99 to a flip-flop 101 which produces a signal at its "1" output. This signal conditions a gate 103 to cause the output binary pulse train on conductor 97 to be applied on a conductor 105 as a feeback signal to summing amplifier 75. The store feature is only operative after the above-described 3-cycle load operation is completed because, until that time, no output signal is available on conductor 97. During the store cycles of operation, gate 91 remains conditioned, gate 89 remains inhibited and the lamp power circuit 15 is inoperative. To accomplish this, when the scan cycle counter 47 contains a count of 3 and flip-flop 101 provides a signal at its "1" output, an AND gate 107 is conditioned. The resulting signal from AND gate 107 is applied to an inverter 103 which, in turn, inhibits AND gate 80. Hence the recirculating lamp sync signals do not activate the lamp power circuit 15 and do not alter the count in the scan cycle counter 47 during the load cycle of operation. Thus, the system output continues to recirculate in converter 7 until the next "start" signal is applied to the scanner on lead 41.

The inventive scanner makes use of an optic-to-acoustic converter to modify an acoustic pulse train in accordance with an optical pattern. Greater sensitivity is achieved in the preferred embodiment of the invention by recirculating the modified pulse trains during subsequent applications of the optical pattern. Alternatively, difference optical patterns may be impressed during successive cycles of operation to enable various functions of optical patterns to be developed. The modified pulse train can be stored for subsequent use by recirculation without further application of optical patterns. These features provide a versatile and simple scanner which has many uses, such as an input device for pattern recognition systems.

While the invention has been particularly shown and described with reference to a preferred embodiment thereof, it will be understood by those skilled in the art that various changes in form and details may be made therein without departing from the spirit and scope of the invention.

What is claimed is:

1. A pattern scanner comprising, in combination, an optic-to-acoustic converter, responsive to acoustic signals applied at an input area of said converter for propagating the signals along a multiline path within said converter to an output area of said converter, and responsive to the impression of an optical pattern upon the converter for modifying the amplitude of the acoustic signals within the converter by amounts related to the intensity of the impressed light;

means for generating a series of acoustic signals at the input area of the converter;

means for impressing an optical pattern upon the converter;

and means responsive to the resultant acoustic signals at the output area of said converter for providing a series of electric signals whose amplitudes are related to the amplitudes of the acoustic signals at the output area of said converter;

whereby an electric signal representation of the impressed pattern is obtained.

2. A pattern scanner comprising, in combination, an optic-to-acoustic converter, responsive to acoustic signals applied to an input area of said converter for propagating the signals along a multiline path within the converter to an output area of said converter, and responsive to the impression of an optical pattern upon the converter for modifying the amplitude of the acoustic signals within the converter by amounts related to the intensity of the impressed light;

means for generating a series of acoustic signals at the input area of the converter for a first cycle of operation;

means for impressing an optical pattern upon the converter during the first cycle of operation;

means responsive to acoustic signals at the output area of said converter for providing a series of electric signals whose amplitudes are related to the amplitudes of the acoustic signals at the output area of said converter;

and means responsive to the series of electric signals for initiating at least one subsequent cycle of operation during which another series of acoustic signals having amplitudes that are related to the amplitudes of the electric signals provided during the previous cycle of operation is generated at the input area of the converter.

3. A pattern scanner comprising, in combination, an optic-to-acoustic converter, responsive to acoustic signals applied at an input area of said converter for propagating the signals along a multiline path within said converter to an output area of said converter, and responsive to the impression of an optical pattern upon the converter for modifying the amplitude of the acoustic signals within the conveter by amounts related to the intensity of impressed light;

means for generating a series of acoustic signals at the input area of the converter for a first cycle of operation;

means for impressing an optical pattern upon the converter during the first cycle of operation;

means responsive to resultant acoustic signals at the output area of said converter for providing a series of electric signals whose amplitudes are related to the amplitudes of the acoustic signals at the output area of said converter;

and means responsive to the series of electric signals for initiating at least one subsequent cycle of operation during which another series of acoustic signals having amplitudes that are related to the amplitudes of the electric signals provided during the previous cycle of operation is generated at the input area of the converter and during which an optical pattern is impressed upon the converter.

4. The apparatus described in claim 3, wherein the same optical pattern is impressed upon the converter during a plurality of cycles of operation.

5. A pattern scanner comprising, in combination, an optic-to-acoustic converter, responsive to acoustic signals applied at an input area of said converter for propagating the signals along a multiline path within said converter to an output area of said converter, and responsive to the impression of an optical pattern upon the converter for modifying the amplitude of the acoustic signals within the converter by amounts related to the intensity of the impressed light;

means for generating a series of acoustic signals at the input area of the converter for a first cycle of operation;

means for impressing an optical pattern upon the converter during the first cycle of operation;

means responsive to resultant acoustic signals at the output area of said converter for providing a series of electric signals whose amplitudes are related to the amplitudes of the acoustic signals at the output area of said converter;

and means responsive to the series of electric signals for initiating at least one subsequent cycle of operation during which another series of acoustic signals having amplitudes that are related to the amplitudes of the electric signals provided during the previous cycle of operation is generated at the input area of the converter and during which the converter operates independently of an optical pattern.

6. A pattern scanner comprising, in combination, an optic-to-acoustic converter, responsive to acoustic signals applied at an input area of said converter for propagating the signals along a multiline path within said converter to an output area of said converter, and responsive to the impression of an optical pattern upon the converter for modifying the amplitude of the acoustic signals within the converter by amounts related to the intensity of the impressed light;

means for generating a series of acoustic signals at the input area of the converter for a first cycle of operation;

means for impressing an optical pattern upon the converter during the first cycle of operation;

means responsive to resultant acoustic signals at the output area of said converter for providing a sequence of electric signals whose amplitudes are related to the amplitudes of the acoustic signals at the output area of said converter;

and means responsive to the series of electric signals for initiating at least two subsequent cycles of operation, during each of which another series of acoustic signals having amplitudes that are related to the amplitudes of the electric signals provided during the previous cycle of operation is generated at the input area of the converter, wherein an optical pattern is impressed upon the converter during at least one of the subsequent cycles, and wherein the converter operates independently of an optical pattern during at least one of the subsequent cycles.

7. The apparatus described in claim 6, wherein the same optical pattern is impressed upon the converter during a plurality of cycles of operation.

8. A pattern scanner comprising, in combination, an optic-to-acoustic converter, responsive to acoustic signals applied at an input area of said converter for propagating the signals along a multiline path within said converter to an output area of said converter, and responsive to the impression of an optical pattern upon the converter for modifying the amplitude of the acoustic signals within the converter by amounts related to the intensity of the impressed light;

means for generating a series of acoustic signals at the input area of the converter;

means for impressing an optical pattern upon the converter at a time when the acoustic signals are present substantially throughout the converter;

and means responsive to the resultant acoustic signals at the output area of said converter for providing a series of electric signals whose amplitudes are related to the amplitudes of the acoustic signals at the output area of said converter;

whereby an electric signal representation of the impressed pattern is obtained.

9. A pattern scanner comprising, in combination, an optic-to-acoustic converter, responsive to acoustic signals applied at an input area of said converter for propagating the signals along a multiline path within said converter to an output area of said converter, and responsive to the impression of an optical pattern upon the converter for modifying the amplitude of the acoustic signals within the converter by amounts related to the intensity of the imperssed light;

means for generating a series of acoustic signals at the input area of the converter for the first cycle of operation;

means for impressing an optical pattern upon the converter during the first cycle of operation at a time when the acoustic signals are present substantially throughout the converter;

means responsive to resultant acoustic signals at the output area of said converter for providing a series of electric signals whose amplitudes are related to the amplitudes of the acoustic signals at the output area of said converter;

and means responsive to the series of electric signals for initiating at least one subsequent cycle of operation during which another series of acoustic signals having amplitudes that are related to the amplitudes of the electric signals provided during the previous cycle of operation is generated at the input area of the converter.

10. A pattern scanner comprising, in combination, an optic-to-acoustic converter, responsive to acoustic signals applied at an input area of said converter for propagating the signals along a multiline path within said converter to an output area of said converter, and responsive to the impression of an optical pattern upon the converter for modifying the amplitude of the acoustic signals within the converter by amounts related to the intensity of the impressed light;

means for generating a series of acoustic signals at the input area of the converter for a first cycle of operation;

means for impressing an optical pattern upon the converter during the first cycle of operation at a time when the acoustic signals are present substantially throughout the converter;

means responsive to resultant acoustic signals at the output area of said converter for providing a series of electric signals whose amplitudes are related to the amplitudes of the acoustic signals at the output area of said converter;

and means responsive to the series of electric signals for initiating at least one subsequent cycle of operation during which another series of acoustic signals having amplitudes that are related to the amplitudes of the electric signals provided during the previous cycle of operation is generated at the input area of the converter and during which an optical pattern is impressed upon the converter at a time when the acoustic signals are present substantially throughout the converter.

11. The apparatus described in claim 10, wherein the same optical pattern is impressed upon the converter during a plurality of cycles of operation.

12. A pattern scanner comprising, in combination, an optic-to-acoustic converter, responsive to acoustic signals applied at an input area of said converter for propagating the signals along a multiline path within a said converter to an output area of said converter, and responsive to the impression of an optical pattern upon the converter for modifying the amplitude of the acoustic signals within the converter by amounts related to the intensity of the impressed light;

means for generating a series of acoustic signals at the input area of the converter for a first cycle of operation;

means for impressing an optical pattern upon the converter during the first cycle of operation at a time when the acoustic signals are present substantially throughout the converter;

means responsive to resultant acoustic signals at the output area of said converter for providing a series of electric signals whose amplitudes are related to the amplitude of the acoustic signals at the output area of said converter;

and means responsive to the series of electric signals for initiating at least one subsequent cycle of operation during which another series of acoustic signals having amplitudes that are related to the amplitudes of the electric signals provided during the previous cycle of operation is generated at the input area of the converter and during which the converter operates independently of an optical pattern.

13. A pattern scanner comprising, in combination, an optic-to-acoustic converter, responsive to acoustic signals applied at an input area of said converter for propagating the signals along a multiline path within said converter to an output area of said converter, and responsive to the impression of an optical pattern upon the converter for modifying the amplitude of the acoustic signals within the region by amounts related to the intensity of the impressed light;

means for generating a series of acoustic signals at the input area of the converter for a first cycle of operation;

means for impressing an optical pattern upon the converter during the first cycle of operation at a time when the acoustic signals are present substantially throughout the converter;

means responsive to resultant acoustic signals at the output area of said converter for providing a series of electric signals whose amplitudes are related to the amplitudes of the acoustic signals at the output area of said converter;

and means responsive to the series of electric signals for initiating at least two subsequent cycles of operation, during each of which another series of acoustic signals having amplitudes that are related to the amplitudes of the electric signals provided during the previous cycle of operation is generated at the input area of the converter, wherein an optical pattern is impressed upon the converter during at least one of the subsequent cycles at a time when the acoustic signals are present substantially throughout the converter and wherein the converter operates independently of an optical pattern during at least one of the subsequent cycles.

14. The apparatus described in claim 13, wherein the same optical pattern is impressed upon the converter during all cycles in which an optical pattern is impressed.

15. A pattern scanner comprising, in combination, an optic-to-acoustic converter, responsive to acoustic signals applied at an input area of said converter for propagating the signals along a multiline path, the alternate lines of which are substantially parallel, within said converter to an output area of said converter and responsive to the impression of an optical pattern upon the converter for modifying the amplitude of the acoustic signals within the region by amounts related to the intensity of the impressed light;

means for generating a series of electric signals;

means responsive to the electric signals for generating a series of acoustic signals at the input area of the converter;

means for impressing an optical pattern upon the converter at a time when the acoustic signals are present substantially throughout the converter;

and means responsive to the resultant acoustic signals at the output area of said converter for providing a series of electric signals whose amplitudes are related to the amplitudes of the acoustic signals at the output area of said converter;

whereby an electric signal representation of the impressed pattern is obtained.

16. A pattern scanner comprising, in combination, an optic-to-acoustic converter, responsive to acoustic signals applied at an input area of said converter for propagating the signals along a multiline path, the alternate lines of which are substantially parallel, within said converter to an output area of said converter and responsive to the impression of an optical pattern upon the converter for modifying the amplitude of the acoustic signals within the converter by amounts related to the intensity of the impressed light;

means for generating a series of electric signals having predetermined amplitudes;

means responsive to the electric signals for generating a series of acoustic signals at the input area of the converter for a first cycle of operation;

means for impressing an optical pattern upon the converter during the first cycle of operation at a time when the acoustic signals are present substantially throughout the converter;

means responsive to resultant acoustic signals at the output area of said converter for providing another series of electric signals whose amplitudes are related to the amplitudes of the acoustic signals at the output area of said converter;

and means responsive to the last-mentioned series of electric signals for initiating at least one subsequent cycle of operation during which another series of acoustic signals having amplitudes that are related to the amplitudes of the electric signals provided during the previous cycle of operation is generated at the input area of the converter.

17. A pattern scanner comprising, in combination, an optic-to-acoustic converter, responsive to acoustic signals applied at an input area of said converter for propagating the signals along a multiline path, the alternate lines of which are substantially parallel, within said converter to an output area of said converter and responsive to the impression of an optical pattern upon the converter for modifying the amplitude of the acoustic signals within the converter by amounts related to the intensity of the impressed light;

means for generating a series of electric signals having predetermined amplitudes;

means responsive to the electric signals for generating a series of acoustic signals at the input area of the converter for a first cycle of operation;

means for impressing an optical pattern upon the converter during the first cycle of operation at a time when the acoustic signals are present substantially throughout the converter;

means responsive to resultant acoustic signals at the output area of said converter for providing another series of electric signals whose amplitudes are related to the amplitudes of the acoustic signals at the output area of said converter;

and means responsive to the last-mentioned series of electric signals for initiating at least one subsequent cycle of operation during which another series of acoustic signals having amplitudes that are related to the amplitudes of the electric signals provided during the previous cycle of operation is generated at the input area of the converter and during which the optical pattern is impressed upon the converter at a time when the acoustic signals are present substantially throughout the converter.

18. A pattern scanner comprising, in combination, an optic-to-acoustic converter, responsive to acoustic signals applied at an input area of said converter for propagating the signals along a multiline path, the alternate lines of which are substantially parallel, within said converter to an output area of said converter, and responsive to the impression of an optical pattern upon the converter for modifying the amplitude of the acoustic signals within the converter by amounts related to the intensity of the impressed light;

means for generating a series of electric signals having predetermined amplitudes;

means responsive to the electric signals for generating a series of acoustic signals at the input area of the converter for a first cycle of operation;

means for impressing an optical pattern upon the converter during the first cycle of operation at a time when the acoustic signals are present substantially throughout the converter;

means responsive to resultant acoustic signals at the output area of said converter for providing another series of electric signals whose amplitudes are related to the amplitudes of the acoustic signals at the output area of said converter;

and means responsive to the last-mentioned series of electric signals for initiating at least one subsequent cycle of operation during which another series of acoustic signals having amplitudes that are related to the amplitudes of the electric signals provided during the previous cycle of operation is generated at the input area of the converter and during which the converter operates independently of an optical pattern.

19. A pattern scanner comprising, in combination, an optic-to-acoustic converter, responsive to acoustic signals applied at an input area of said converter for propagating the signals along a multiline path, the alternate lines of which are substantially parallel, within said converter to an output area of said converter, and responsive to the impression of an optical pattern upon the converter for modifying the amplitude of the acoustic signals within the converter by amounts related to the intensity of the impressed light;

means for generating a series of electric signals of predetermined amplitudes;

means responsive to the electric signals for generating a series of acoustic signals at the input area of the converter for a first cycle of operation;

means for impressing an optical pattern upon the converter during the first cycle of operation at a time when the acoustic signals are present substantially throughout the converter;

means responsive to resultant acoustic signals at the output area of said converter for providing another series of electric signals whose amplitudes are related to the amplitudes of the acoustic signals at the output area of said converter;

and means responsive to the last-mentioned series of electric signals for initiating at least two subsequent cycles of operation, during each of which another series of acoustic signals having amplitudes that are related to the amplitudes of the electric signals provided during the previous cycle of operation is generated at the input area of the converter, wherein the optical pattern is impressed upon the converter, during at least one of the subsequent cycles at a time when the acoustic signals are present substantially throughout the converter, and wherein the converter operates independently of an optical pattern during at least one of the subsequent cycles.

20. The apparatus described in claim 15, wherein acoustic pulses are only present on alternate lines within the converter at the time that the optical pattern is impressed.

21. The apparatus described in claim 20 wherein the converter is a cadmium sulfide crystal with a width of approximately 1.5 cm. and the acoustic signals occur at a frequency of approximately 3 mc. with a duty cycle of approximately 0.1.

22. The apparatus described in claim 15, wherein the optical pattern is impressed upon the converter by the activation of an image lamp which is controlled by a lamp sync signal that is propagated through the converter in advance of the acoustic signals which are to be modified by the optical pattern.

23. The apparatus described in claim 22, wherein the converter is a cadmium sulfide crystal and the image lamp produces energy at least in the wavelength range between 5100 A. and 8000 A.

24. The apparatus described in claim 22, wherein a quench lamp is activated after the activation of the image lamp.

25. The apparatus described in claim 24, wherein the converter is a cadmium sulfide crystal, the image lamp produces energy at least in the wavelength range between 5100 A. and 8000 A. and the quench lamp produces energy at least in the wavelength range between 8000 A. and 10,000 A.

26. The apparatus described in claim 15, wherein the acoustic signals are applied to and derived from the converter by means of quartz piezoelectric crystal transducers.

27. A pattern scanner comprising, in combination:

an optic-to-acoustic converter comprising a cadmium sulfide crystal having a width of approximately 1.5 cm. and responsive to acoustic signals that are applied at an input area, for propagating the acoustic signals along a raster of approximately 20 essentially parallel scan lines with a rescan line interspersed between each adjacent pair of scan lines to an output area, and responsive to the impression of an optical pattern upon the region of the converter that contains the scan and rescan lines for modifying the amplitude of the acoustic signals by amounts related to the intensity of the impressed light;

electric signal generating means for producing one series of electric scan signals of equal amplitude for each scan line, where each series of electric signals has a frequency of approximately 3 mc. and a duty cycle of approximately 0.1, and where each series of electric signals is separated from the successive series of electric signals by a time duration equal to the time required for an acoustic signal to traverse a rescan line, and for producing a lamp sync signal at a predetermined time before the production of the first electric signal;

an input quartz piezoelectric crystal transducer located at the input area of the converter and responsive to the signals produced by the electric signal generating means for developing acoustic input signals to the converter;

an output quartz piezoelectric crystal transducer located at the output area of the converter and responsive to acoustic signals for developing electric signals having amplitudes that are dependent upon the amplitudes of the acoustic signals;

an image lamp for producing energy at least in the wave length range between 5100 A. and 8000 A. and arranged to impress the optical pattern upon the region of the converter that contains the scan and rescan lines when the lamp is activated;

a quench lamp for producing energy at least in the wave length range between 8000 A. and 10,000 A. for flooding the region of the converter that contains the scan and rescan lines with energy in this wavelength range when activated;

means responsive to the lamp sync signal developed by the output transducer for activating the image lamp at a time when the acoustic signals are present on the scan lines and when no acoustic signals are present on the rescan lines, and for subsequently activating the quench lamp;

and pulse shaping means responsive to the electric signals developed by the output transducer for producing electric output signals having amplitudes that are related to the amplitudes of the electric signals developed by the output transducer and having predetermined equal durations.

28. The apparatus described in claim 27, wherein the output signals from the pulse shaping means are applied to the input transducer in place of the signals from the electric signal generating means during two subsequent cycles of operation during which the optical pattern is impressed upon the converter.

29. The apparatus described in claim 28, wherein the output signals from the pulse shaping means are applied to the input transducer during a plurality of more subsequent cycles of operation during which the converter operates independently of an optical pattern.

References Cited

UNITED STATES PATENTS

| | | | |
|---|---|---|---|
| 3,035,200 | 5/1962 | Yando. | |
| 3,065,378 | 11/1962 | Zaks | 315—55 |
| 3,072,821 | 1/1963 | Yando | 315—55 |
| 3,121,824 | 2/1964 | Talesnick | 315—55 |
| 3,132,276 | 5/1964 | Yando | 315—55 X |
| 3,254,266 | 5/1966 | Fleming-Williams | 315—55 |

MAYNARD R. WILBUR, *Primary Examiner.*

THOMAS J. SLOYAN, *Assistant Examiner.*

U.S. Cl. X.R.

181—.5; 235—61.11; 315—55